(12) United States Patent
Piri et al.

(10) Patent No.: US 11,930,006 B2
(45) Date of Patent: Mar. 12, 2024

(54) SYSTEM AND METHOD FOR HOSTING FIDO AUTHENTICATORS

(71) Applicant: IDMELON TECHNOLOGIES INC., Vancouver (CA)

(72) Inventors: Bahram Piri, Vancouver (CA); Hassan Seifi, Vancouver (CA)

(73) Assignee: IDMELON TECHNOLOGIES INC., Vancouver (CA)

( * ) Notice: Subject to any disclaimer, the term of this patent is extended or adjusted under 35 U.S.C. 154(b) by 0 days.

(21) Appl. No.: 18/143,909

(22) Filed: May 5, 2023

(65) Prior Publication Data

US 2023/0388298 A1    Nov. 30, 2023

Related U.S. Application Data

(60) Provisional application No. 63/346,302, filed on May 26, 2022.

(51) Int. Cl.
*H04L 9/40* (2022.01)
*H04W 12/47* (2021.01)

(52) U.S. Cl.
CPC ......... *H04L 63/0853* (2013.01); *H04W 12/47* (2021.01)

(58) Field of Classification Search
CPC .......................... H04L 63/0853; H04W 12/47
See application file for complete search history.

(56) References Cited

U.S. PATENT DOCUMENTS

2017/0180988 A1* 6/2017 Kim .................... H04L 63/0861
2020/0374284 A1* 11/2020 Suresh .................. H04L 63/10

* cited by examiner

*Primary Examiner* — Anthony D Brown
(74) *Attorney, Agent, or Firm* — Norton Rose Fulbright Canada LLP; Maya Medeiros

(57) ABSTRACT

A system or method for hosting and managing FIDO authenticators in local network or cloud for users in a shared multi-user environment; which receives an authentication request initiated by a relying party application on a computing device via Web Authentication (WebAuthn) interface; and uses unique identifiers (such as RFID tags) to distinguish the hosted authenticators associated with each user to forward the authentication request; and receiving a response to that authentication request from the hosted authenticator on the local network or cloud; and transmitting the authentication response back to the sender application on the computing device for authentication purposes.

17 Claims, 7 Drawing Sheets

SYSTEM AND METHOD FOR HOSTING FIDO AUTHENTICATORS

CROSS REFERENCE TO RELATED APPLICATION

This application claims priority to and the benefit of U.S. Provisional Patent Application No. 63/346,302 entitled A SYSTEM AND METHOD FOR HOSTING FIDO AUTHENTICATORS and filed May 26, 2022, the entire contents of which is hereby incorporated by reference.

FIELD

Embodiments described herein generally relate to managing authenticators, such as dedicated authenticators or Hardware Security Module (HSM) based authenticators).

INTRODUCTION

Using a password entails security and performance issues and challenges. Standards and protocols such as Web Authentication (WebAuthn) application program interface (API) and Fast Identity Online (FIDO) provide users passwordless authentication using security keys (e.g. smartphone or hardware security key in the term of authenticator). Users interact with online resources (e.g. web browsers or applications as relying party) that utilize the WebAuthn API to register and authenticate themselves using FIDO Client to Authenticator Program (CTAP) with an authenticator. The authenticator can register a user with a given web application and later assert possession of the registered credential, and optionally verify the user, when requested by the web application.

Passwordless authentication systems allow users to authenticate with a secure device instead of a password and assert their identity to systems with a strong public key credential rather than a shared secret (e.g., a password). The credentials belong to the user and are managed by the authenticator, with which the relying party application interacts through the client platform (e.g., a browser application). The relying party application can (with the user's consent) request the browser to create a new credential for future use by the relying party. The relying party application can also request the user's permission to perform authentication operations with an existing credential.

This method requires a unique hardware authenticator for each user in order to function properly. It may not be possible to provide separate authenticators for individuals in certain environments. An example of such an environment is very large organizations like hospitals, which often use items such as Secure Access Systems (e.g., Radio Frequency Identification—RFID) due to their lower security concerns.

The use of secure access systems are widespread and such systems have many applications, including but not limited to tracking, identification or tagging, access control, payment, and so on. Secure access systems are widely used to ensure only authorized personnel are permitted entry to a building or area, allowing an employee to enter their office but not an unauthorized person, for example. Authentication is typically achieved by use of a short-range wireless communications module such as an RFID tag or access card being presented at close range to a reader located near an entry point to a secure area. The reader, or associated local control unit, may contain the necessary information to authenticate the tag or, in many cases, will be connected to a central authentication unit, and if the person is authorized to enter the secure area, the associated door will be unlocked or opened.

Secure access systems can have more than one entry point, thus requiring a number of readers. If the authentication information is stored in the reader, or associated local control unit then a system having multiple readers can be expensive and requires each reader to be updated separately with any new or changed information. Alternatively, if the readers communicate with a central authentication unit, significant costs and effort are required to install the wires or cables required to connect each reader to the central unit. In any event, the installation of the readers requires each reader to be provided with a power connection irrespective of whether a data communication connection is required so the installation of such systems is expensive and complex.

SUMMARY

Embodiments described herein relate to managing authenticators, (e.g. dedicated or HSM based authenticators) hosted in local network or in a cloud system in a shared multi-user environment. Embodiments described herein relate to receiving authentication requests initiated via a WebAuthn interface and using short-range wireless communication, such as a RFID tag or access card, as a unique identifier to identify the associated remote hosted authenticator to bind to the related user to forward the authentication request and receive a response to transmit back to the sender application.

Embodiments described herein relate to methods and systems for enabling passwordless authentication to get access to computers and/or applications in a shared multi-user environment using short range wireless communication with a local device or system associated with control or access function. It can be difficult and costly to provide separate authenticators for individuals. HSM can be used to implement multiple authenticators for users. The following detailed description provides details of hosting remote authenticators (e.g. dedicated or HSM based) on local network or cloud and using an identifier (e.g. coming from a RFID tag or access card or any other type of code) to uniquely identify a hosted authenticator to map and bind users to their associated authenticator(s) to implement FIDO authentication processes in a shared multi-user environment. In this way, in the absence of dedicated hardware security keys for individual users, HSM authenticators can be created for as many users as possible and/or required on the local network or cloud. In order to authenticate or log in, each user's unique identifier (e.g. coming from corresponding RFID tag or access card) can be used to identify the associated authenticator. In this case, users can log in simply by tapping the RFID tag or access card (entering the unique identifier).

An authenticator is a cryptographic entity, existing in hardware or software, which can register a user and later assert possession of the registered public key credential, and optionally verify the user, when requested by an application. A WebAuthn Authenticator could be a roaming authenticator (e.g. a portable hardware), a platform authenticator which is a dedicated hardware subsystem integrated into the client device, or a virtual authenticator which is an HSM based implementation of an authenticator on local network or cloud. Authentication operations refer to both registration and assertion requests and any other related requests.

A computing device supports a WebAuthn API that is configured to access an authenticator over a transport such as Universal Serial Bus (USB) using the Human Interface Device (HID) protocol. WebAuthn API is compliant with portions of the Web Authentication protocol formerly referred to as FIDO 2.0 which describes an interoperable way of performing online authentication using physical devices across web browser applications.

When using WebAuthn API to access an authenticator from a browser application to perform authentication compliant with FIDO Alliances standards including FIDO 2.0, FIDO 2.1, and etc., it is possible for the computing device to be coupled to the authenticator through a virtual transport protocol interface and an authenticator hosting service—using Client-to-Authenticator Protocol (CTAP).

A virtual transport protocol interface is a software device driver that emulates hardware (such as USB Interfaces) and other devices so that multiple applications can access hardware interrupt channels, hardware resources, and memory without causing conflicts. A virtual driver, for example, can be installed on an operating system of a computing device to simulate a standard authenticator on a USB interface to receive the authentication request.

A unique identifier can be a code such as a mobile number or any code coming directly from an application or from any device equipped with short-range wireless communication protocol such as RFID tags or access cards which can be used in secure access systems. The RFID tag or access card may have room to store different items based on the required functionality, and it includes a unique identifier.

Hardware Security Module (HSM) is a physical computing device that safeguards and manages digital keys and performs encryption and decryption functions which makes creating and managing, generally hosting, FIDO authenticators (e.g. security keys) possible. These modules are in the form of a plug-in card or an external device that attaches directly to a computing device or network server and contains one or more secure crypto-processor chips.

A virtual transport protocol interface as a driver in computing device can play the role of a hardware (such as USB security key) and can be managed to forward the received request to an authenticator hosting service to make connection to associated authenticators (security keys).

An application service is responsible for reading a user's unique identifiers (such as RFID tag or access card) from a connected device such as RFID/NFC reader (or any other type of code directly on application) when the tap of tag or access card is detected and passing them to authenticator hosting service to help determine the associated authenticators (security keys) to bind to the related user.

The virtual transport protocol interface may be able to take responsibility for application service as well and communicate to an authenticator hosting service directly as required.

An authenticator hosting service or application is responsible for managing hosted authenticators (dedicated or roaming authenticators and HSM based authenticators) virtually on local network or cloud with access to secure storage or cryptographic hardware such as HSM, and mapping user's unique identifiers (such as RFID tags or access cards) with associated hosted authenticators (security keys) to route authentication requests to the target authenticator.

A virtually hosted authenticator is an authenticator managed by authenticator hosting service and configured to be accessed by only one user with a unique associated identifier the user possesses for authentication purposes.

In accordance with an aspect, there is provided a system and method to communicate the authentication requests and responses to a specified remote authenticator (hosted on local network or cloud). The application service can be implemented on the computing device to ease the communication between virtual transport protocol interface and authenticator hosting service.

In accordance with an aspect, a system and method is provided to help users to bind their unique identifiers (such as RFID tags) to the associated remote hosted authenticators (dedicated security keys or HSM based authenticators) using an application service and also a virtual transport protocol interface on a computing device by only tapping the tag on the reader or entering the code directly as the unique identifier.

In accordance with an aspect, a system and method is provided to map and bind a user's unique identifiers to associated remote hosted (dedicated or HSM based) authenticators based on FIDO by an authenticator hosting service to authenticate users and make log in possible to a computing device or application.

According to some embodiments, there is provided a system for hosting FIDO authenticators on a local network or a cloud server using dedicated hardware or software security key modules or Hardware Security Modules).

The system has a computing device having a Web Authentication (WebAuthn) client software, an application service, and a transport protocol interface, wherein the WebAuthn client software represents a relying party application on the computing device, wherein the WebAuthn client software has a WebAuthn Application Program Interface (API) to communicate with a one or more hosted authenticators through an interface on the computing device to send an authentication request associated with a user, receive an authentication response from the one or more hosted authenticators, and return the authentication response to verify the user to WebAuthn client software representing the relying party.

The system has a machine readable unique identifier that can be used to uniquely identify the one or more hosted authenticators, and to provide an authorization gesture implying the user's interaction with the one or more hosted authenticators while processing the authentication request;

In some embodiments, the application service reads the unique identifier from a connected device, and passes the unique identifier to an authenticator hosting service through a network. The connected device has a reader and application programming interface that provides the unique identifier to the application service using a communication link on the computing device, the connected device configured to detect the unique identifier via short-range wireless communication;

In some embodiments, the transport protocol interface is a driver installed on the computing device to receive authentication requests from the WebAuthn API, to exchange authentication requests with the authenticator hosting service through the network, and to write the authentication response which is taken back from the authenticator hosting service on the interface of the computing device that is used for authentication;

In some embodiments, authenticator hosting service virtually hosts the one or more hosted authenticators within computing applications, and to route authentication requests to a target authenticator of the one or more hosted authenticators;

In some embodiments, the one or more hosted authenticators are to be accessed by the unique identifier for authentication purposes, wherein the one or more hosted authenticators register the user with a given relying party application by creating a credential key pair, and later asserting possession of the registered public key credential using the unique identifier.

In some embodiments, the one or more virtually hosted authenticators verify the user when requested by the relying arty application.

In some embodiments, the device for creating the unique identifier is a radio frequency identification (RFID) access card or tag for authentication purposes.

In some embodiments, the interface is selected from the group of USB, BLE, NFC, Hybrid and HTTP/HTTPs to send the authentication request.

In some embodiments, the authentication requests are initiated at the WebAuthn client software using the WebAuthn API for authentication purposes.

In some embodiments, an authenticator existing in remote dedicated hardware or software or stored on HSM can register the user with a relying party application and later assert possession of the registered public key credential, and optionally verify the user, when requested by the relying party application.

In some embodiments, WebAuthn API defines a standard web interface enabling the creation and use of strong, attested, scoped, public key-based credentials by web applications, for the purpose of strongly authenticating users.

In some embodiments, an authentication request can start a registration process by which a public key credential is created on a hosted authenticator (dedicated or HSM based), and scoped to a relying party with the present user's account, an authentication process by which a relying party is presented with an authentication assertion proving the presence and consent of the user who registered the public key credential, or any other authentication operation defined in WebAuthn standard interface used by relying party application for authentication purposes.

According to an aspect, embodiments described herein provide a virtual transport protocol interface, installed on a computing device and acts as a virtual driver, and accessible for a relying party application running inside web browser/application/service through standard WebAuthn API (application program interface). The virtual transport protocol interface: receives an authentication request through the interface presented by virtual driver; communicates with the authenticator hosting service through network (an application on the network) to proceed the authentication process; receives the authentication response back from authenticator hosting service and optionally manipulate the structure of the received response making it compatible to be transferred through the same interface virtual driver; and writes the response on the interface where the sender of the request can collect the data for relying party application for the authentication purposes.

In some embodiments, the virtual transport protocol interface extends the operating system in order to emulate a hardware device supporting authentication standard.

According to an aspect, embodiments described herein provide an application service, installed on a computing device beside other applications for receiving user's unique identifiers from a connected device such as RFID/NFC reader when a tap of RFID tags or access cards is detected via short-range wireless communication, or receiving any other type of codes directly from the application, and sending them to authenticator hosting service to uniquely identify hosted authenticators and bind related user to the associated remote hosted authenticator. The application service: waits for the user to take action such as tapping the tag or access card on the reader or entering the code as the unique identifier inside the application; receives RFID access card or tags' data through the corresponding device (reader) and related API or any code as the unique identifier directly from the application; transmits the received data through network (an application on the network) to authenticator hosting service, helping for determining associated authenticator.

In some embodiments, the application service is configured to facilitate communication over the network as well as mapping and binding the user with the unique identifier (RFID tag or access card) to the associated remote hosted authenticator.

In some embodiments, the application service is configured to be able to work as an application accessing user interface elements to receive user's unique identifier and display any information necessary for this purpose on the computing device to the user.

In some embodiments, the virtual transport protocol interface and the application service can be combined together to work as an integrated component.

According to an aspect, embodiments described herein provide an authenticator hosting service or application installed on a remote server over the network to virtually host and manage different types of authenticators with accessing to secure storage or cryptographic hardware such as hardware secure module (HSM), configured to map and bind users with unique identifiers (RFID tag or access card) to the associated remote hosted authenticators, and route the authentication requests to the mapped authenticator. The authenticator hosting service can: receive authentication requests from virtual transport protocol interface through the network (an application on the network); receive user's unique identifiers from application service through the network (an application on the network); map and bind users with unique identifiers (RFID tag or access card) to the associated authenticators (dedicated or HSM based authenticator); initiate the connection with the associated authenticator to proceed with the authentication request; send the authentication request to the associated dedicated authenticator or authenticator stored on HSM; transmit the received response form associated authenticator back through network (an application on the network) to virtual transport protocol interface to deliver it to the WebAuthn client through WebAuthn API.

In some embodiments, the authenticator hosting service can be installed on a server in local network or a remote server over internet.

In some embodiments, the authenticator hosting service may be placed directly on cloud as a server or set of cloud functions.

In some embodiments, the authenticator hosting service can communicate separately with virtual transport protocol interface in claim 6 and application service in claim 8 in local network or over internet, or it may communicate with one integrated component consisting of both of them.

According to an aspect, embodiments described herein provide a method for hosting FIDO authenticators on a local network or a cloud server using dedicated hardware or software security key modules or Hardware Security Modules). The method comprises reading, by an application service, a machine readable unique identifier from a connected device, wherein the connected device has a reader and application programming interface that provides the unique identifier to the application service using a communication link on the computing device, the connected device configured to detect the unique identifier via short-range wireless communication, wherein the machine readable unique identifier uniquely identifies the one or more hosted authenticators to provide an authorization gesture implying the user's interaction with the one or more hosted authenticators while processing the authentication request; passing the unique identifier to an authenticator hosting service through a network, the authenticator hosting service virtually hosting one or more hosted authenticators within computing applications, and routing authentication requests to a target authenticator of the one or more hosted authenticators; receiving, at a transport protocol interface is a driver installed on a computing device, an authentication request from Web Authentication (WebAuthn) client software represents a relying party application on the computing device, to exchange authentication requests with the authenticator hosting service through the network, and to write the authentication response which is taken back from the authenticator hosting service on the interface of the computing device that is used for authentication, a computing device having a, an application service, and a transport protocol interface; accessing the one or more hosted authenticators by the unique identifier for authentication purposes, wherein the one or more hosted authenticators register the user with a given relying party application by creating a credential key pair, and later asserting possession of the registered public key credential using the unique identifier.

In some embodiments, the method further comprises verifying, by the one or more virtually hosted authenticators, the user when requested by the relying arty application.

In some embodiments, the method further comprises creating the unique identifier as a radio frequency identification (RFID) access card or tag for authentication purposes.

In some embodiments, the method further comprises initiating the authentication requests at the WebAuthn client software using a WebAuthn API for authentication purposes.

In some embodiments, the method further comprises registering the user with the relying party application using an authenticator existing in remote dedicated hardware or software or stored on HSM can to later assert possession of the registered public key credential.

In some embodiments, the method further comprises verifying the user, when requested by the relying party application.

In some embodiments, the method further comprises, by the WebAuthn API, defining a standard web interface enabling the creation and use of strong, attested, scoped, public key-based credentials by web applications, for strongly authenticating users.

In some embodiments, the method further comprises completing a registration process by which a public key credential is created on a hosted authenticator (dedicated or HSM based), and scoped to a relying party with the present user's account, an authentication process by which a relying party is presented with an authentication assertion proving the presence and consent of the user who registered the public key credential, or any other authentication operation defined in WebAuthn standard interface used by relying party application for authentication purposes.

Many further features and combinations thereof concerning embodiments described herein will appear to those skilled in the art following a reading of the instant disclosure.

DESCRIPTION OF THE FIGURES

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

In the figures,

FIG. 4A illustrates authentication process when the network component (application on the network) waits or pulls the unique identifier from the reader.

FIG. 4B illustrates authentication process when the virtual transport protocol interface triggers the reader to get the unique identifier and deliver it to the application service.

FIG. 4C illustrates authentication process when the virtual transport protocol interface and application service are combined in one integrated entity.

FIG. 4D illustrates authentication process when there is no application on the network.

DETAILED DESCRIPTION

To use a passwordless authentication system, a relying party (e.g., web server) application running inside a web browser or a computing device directly uses WebAuthn APIs to send authentication requests to a nearby dedicated hardware or software WebAuthn standard authenticator through USB as an example supported interface. The nearby dedicated hardware or software authenticator and be replaced by a remote hosted authenticator and the supported interface also can be replaced by a virtual device driver (virtual transport protocol interface). Embodiments described herein relate to systems and processes of forwarding authentication requests received via virtual transport protocol interfaces to authenticators hosted on dedicated hardware/software security keys on a remote server or HSM based security keys across a network (local or cloud) through an authenticator hosting service. To proceed to the authentication process, the users provide an identifier (such as RFID tag or access card) to uniquely identify their associated hosted security keys (either dedicated authenticators or those on the HSM). For this purpose, an application service reads the user's unique identifiers from a connected device such as RFID/or Near Field Communication (NFC) reader when the tap of tag or access card is detected and passes them to authenticator hosting service which is responsible to map and bind the user with the identifier to the associated authenticator to continue the authentication process through FIDO2 CTAP protocol. The application service maps a user's unique identifier from the tag or access card to the hosted authenticator. The WebAuthn API is used throughout the remainder of this application as an API enabling the creation and use of strong, attested, scoped, public key-based credentials by web applications, for the purpose of strongly authenticating users. Conceptually, one or more public key credentials, each scoped to a given WebAuthn Relying Party, are created by and bound to authenticators as requested by the web application. Other authentication application interface such as django-mfa2, python-fido2 etc. may also benefit from the techniques described herein.

Figure 1:
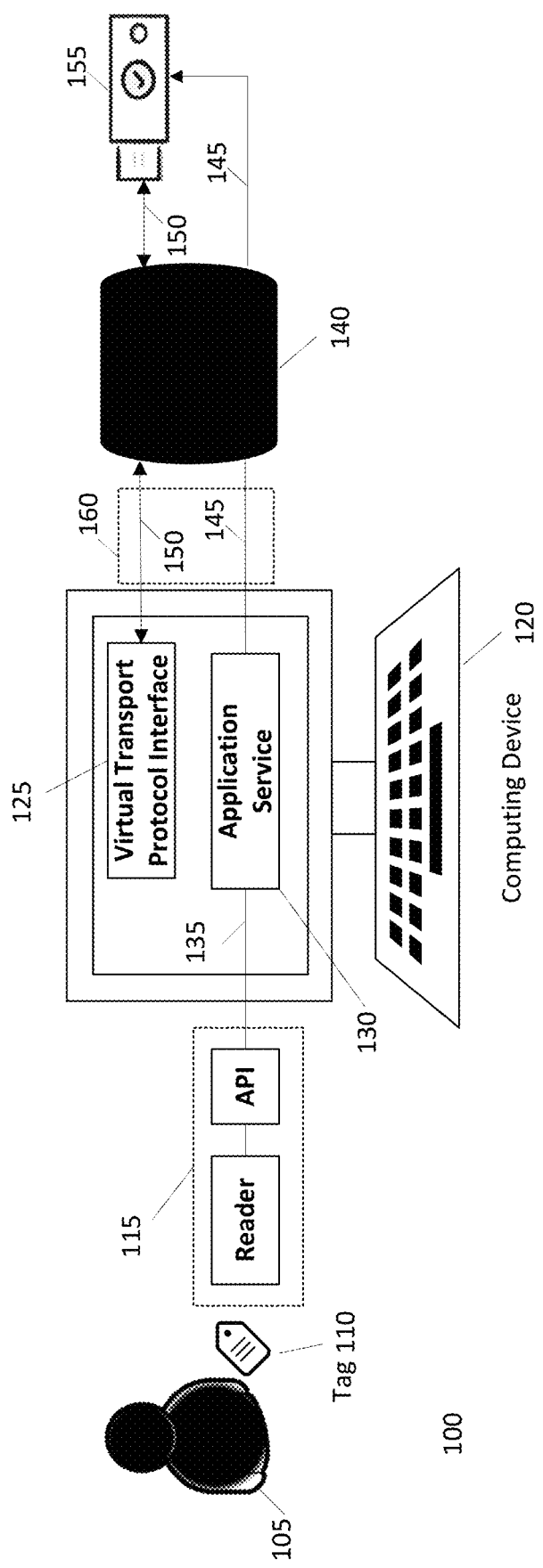
FIG. 1 illustrates a system-architecture diagram for implementation of a process of hosting FIDO authenticators in which user computing device establishes the connection between the user with short-range wireless device (RFID tag or access card) and the FIDO authenticator hosted on network (local or cloud).

FIG. 1 illustrates a system 100 for hosting FIDO authenticators in which a computing device establishes the connection between a short-range wireless device (RFID tag or access card) and the FIDO authenticator hosted on network (e.g. local or cloud).

As shown in FIG. 1, system 100 has various components associated with respective users 105, and is configured to run a relying party application on a computing device 120. A relying party application is an entity application that relies on the validity of a unique identifier for the authentication to verify or establish the identity of the user 105 or associated device. FIG. 1 illustrates a high-level view of the overall architecture of an example system 100 (e.g. that can be used to authenticate the user 105) which can include a device for creating a unique identifier such as an RFID tag or access card 110, a connected device 115 (e.g. a set of out of band recipient reader and related API) that provides the unique identifier to the application service 130 using a communication link 135 on the computing device 120. The system 100 further includes a virtual transport protocol interface 125 that simulates hardware operations as a driver, and connects to the network (an application on the network) 140. There is data communications 145/150 between FIDO hosted authenticators (or security keys) 155 and the application service 130, and also to the virtual transport protocol interface 125. There is the possibility of data path integration 160 (145/150). That is, the transfer 145 of data related to the unique identifier 110 by application service 130, as well as authentication request from path 150 by virtual transport protocol interface 125, can be combined and integrated into one communication path 160. Accordingly, system 100 enables communication with FIDO hosted authenticators (or security keys) 155 over network (local or cloud) 140.

The unique identifier is a machine readable identifier that can be read by a connected device 115 (e.g. reader 115 and related API). The unique identifier can include a code such as a mobile number or can be embodied on a device 110 which can be, for example, multiple types of short-range wireless (RFID tag or access card 110) devices such as Low Frequency (LF) RFID, High Frequency (HF) RFID such as NFC, Ultra-High Frequency (UHF) RFID, Passive and Active and also Battery-Assisted Passive (BAP) RFID. The connected device can include a reader 115 that can be an external pluggable device or a built-in device such as Microsoft Surface NFC Reader.

The computing device(s) 120 can include, for example tablets, PCs (personal computers), laptops, gaming consoles, or the like. The computing device 120 has non-transitory memory, one or more hardware processors, I/O interface, and a network interface to communicate over network 140. The computing device 120 and virtual transport protocol interface 125 (e.g. device driver) present a WebAuthn standard authenticator interface that can be recognized by the operating system (OS) of the computing device 120 as a proper implementation to serve the authentication requests.

The virtual transport protocol interface 125 (virtual driver) simulates the standard authenticator 155 that can be accessed by an interface like USB. The WebAuthn standard authenticator interface can be a WebAuthn client application and WebAuthn API to represent a relying party application.

The application service 130 is responsible for receiving 135 a user's unique identifier (embodied on an access card 110) from a connected device such as RFID/NFC reader 115 when a tap of tag or access card 110 is detected and transferring the identifier as data 145 through network (or an application on the network) 140. The computing device 120 may additionally include some other services running beside the virtual transport protocol interface 125 (virtual driver) to assist and facilitate data communication to the FIDO hosted authenticators (or security keys) 155 or an authenticator hosting service 340 (see e.g. FIG. 3).

The virtual transport protocol interface 125 may be configured to work in conjunction with the application service 130 to exchange the authentication requests/responses with the user's 105 computing device 120 over a network (an application on the network) 140.

The network 140 can include any type or collection of networks, such as a personal area network, local area network, wide area network, or the Internet.

In the proposed architecture in FIG. 1 100, user 105 provides a unique identifier such as an RFID tag or access 110 which can be transmitted through a corresponding reader and related API 115 to the application service 130 through the specified communication path 135. The identifier 110 will be transmitted by application service 130 to the FIDO hosted authenticators (or security keys) 155 through communication path 145, or authenticator hosting service 340 (FIG. 3) over the network (an application on the network) 140 through the specified communication path 145. The authenticator hosting service 340 uniquely identifies the associated FIDO remote hosted authenticator (security key) 155 based on the received unique identifier which has been registered for the user 105 when the related relying party was creating the credential key pair. However, in order to perform the authentication process, the virtual transport protocol interface 125 (which simulates the corresponding hardware operations on the computing device 120 as a driver) receives authentication requests from the relying party application and pass the data over the network (an application on the network) 140 to the authenticator hosting service 340. The complete authentication process requires the exchange of data using the CTAP protocol with authenticators (security keys) 155 stored and hosted on network 140. It should be noted that the transfer 145 of data related to the unique identifier 110 by application service 130, as well as other required data 150 by virtual transport protocol interface 125, can be combined and integrated in one communication path 160 and in either of these two (application service 130 or virtual transport protocol interface 125).

Accordingly, FIG. 1 illustrates an example system 100 for hosting FIDO authenticators on a local network or a cloud network using dedicated hardware or software security key modules or HSM (Hardware Security Module). The system 100 has a computing device 120 having a WebAuthn client application service representing a relying party application. The computing device 120 has networking capability that can be configured with a WebAuthn API to communicate with a hosted authenticator 155 through an interface to send an authentication request, receive a response from an authenticator 155, and return the response back to the relying party application to verify the user 105.

The system 100 has a device (e.g. tag or card 110) for creating a unique identifier that can be used to uniquely identify a hosted authenticator 155, and to provide a form of authorization gesture implying user's interaction with the hosted authenticator while processing the authentication request.

The system 100 has a connected device 115 (with a reader and API) that provides the unique identifier (read from the tag or card 115) to the application service 130 using a communication link 135 on the computing device 120.

The system 100 has the application service 130, installed on the computing device 120, that is configured to receive a unique identifier from the connected device 115 (such as RFID/NFC reader, when a tap of RFID tag or access card is detected via short-range wireless communication) over a communication path 135, and to pass the identifier to the authenticator hosting service (e.g. hosted authenticator 155) through network 140 (e.g. an application on the network).

The system 100 has a standard or virtual transport protocol interface 125 as a virtual driver installed on the computing device 120. The transport protocol interface 125 is configured to receive authentication requests from WebAuthn API, to exchange authentication requests with the authenticator hosting service (e.g. hosted authenticator 155) through the network 140 (or an application on the network), and to write an appropriate authentication response which is taken back from the authenticator hosting service on the same standard interface of the computing device 120 that is used for authentication.

The system 100 has an authenticator hosting service or application configured to virtually host authenticators 155 within computing applications, with access to secure storage or cryptographic hardware such as HSM, or cryptographic entities, existing in hardware or software, and to route authentication requests to the target authenticator 155.

The system 100 has a virtually hosted authenticator 155 configured to be accessed by only one user 105 with a unique identifier (on tag 110) that the user 105 possesses for authentication purposes. The system 100 can register the user 105 with a given relying party application by creating a credential key pair, and later asserting possession of the registered public key credential, and optionally verify the user, when requested by the relying arty application.

Figure 2:
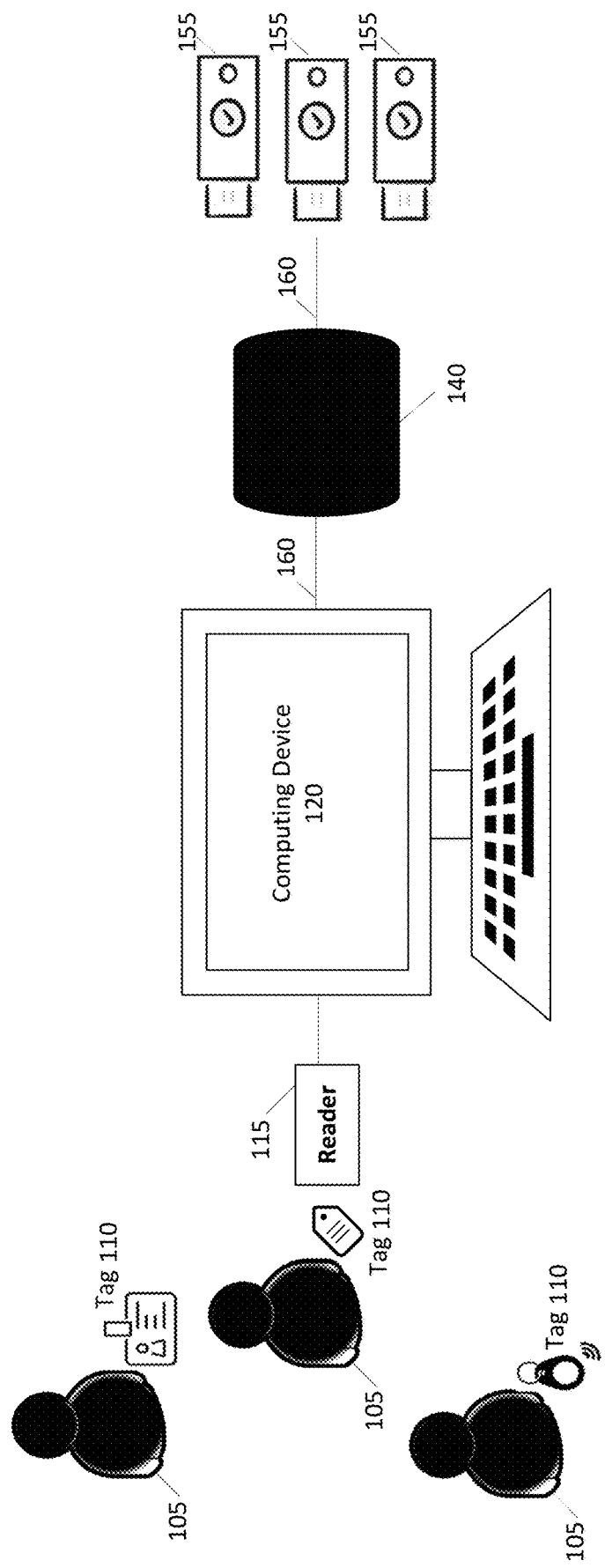
FIG. 2 shows an illustrative environment in which each unique identifier like short-range wireless device (e.g., RFID tag or access card) has an equivalent remote hosted authenticator (security key) than can be bound to the related user.

Referring now to FIG. 2, it is an exemplary architecture of a system 100 200 to specify the existence of a discrete mapping between user's 105 unique identifiers 110 (different types of RFID tags or access cards or any other type of codes) and FIDO remote hosted authenticators (security keys) 155. The authentication process in FIG. 2 implemented by system 200, starts with providing unique identifier using different types of RFID tags or access cards 110 by users 105 which will be transmitted to the computing device 120 by a reader 115. Afterwards, system 200 enables transfer by a communication path 160 of unique identifiers 110 using the application service 130 provided on the computing device 120 to the network (an application on the network) 140, which allows binding users with unique identifier (RFID tag or access card 110) to the associated FIDO remote hosted authenticator 155 in order to complete the authentication process. As shown, there may be multiple remote hosted authenticators 155 linked to multiple unique identifiers 110 (which are in turn linked to multiple users 105).

Figure 3:
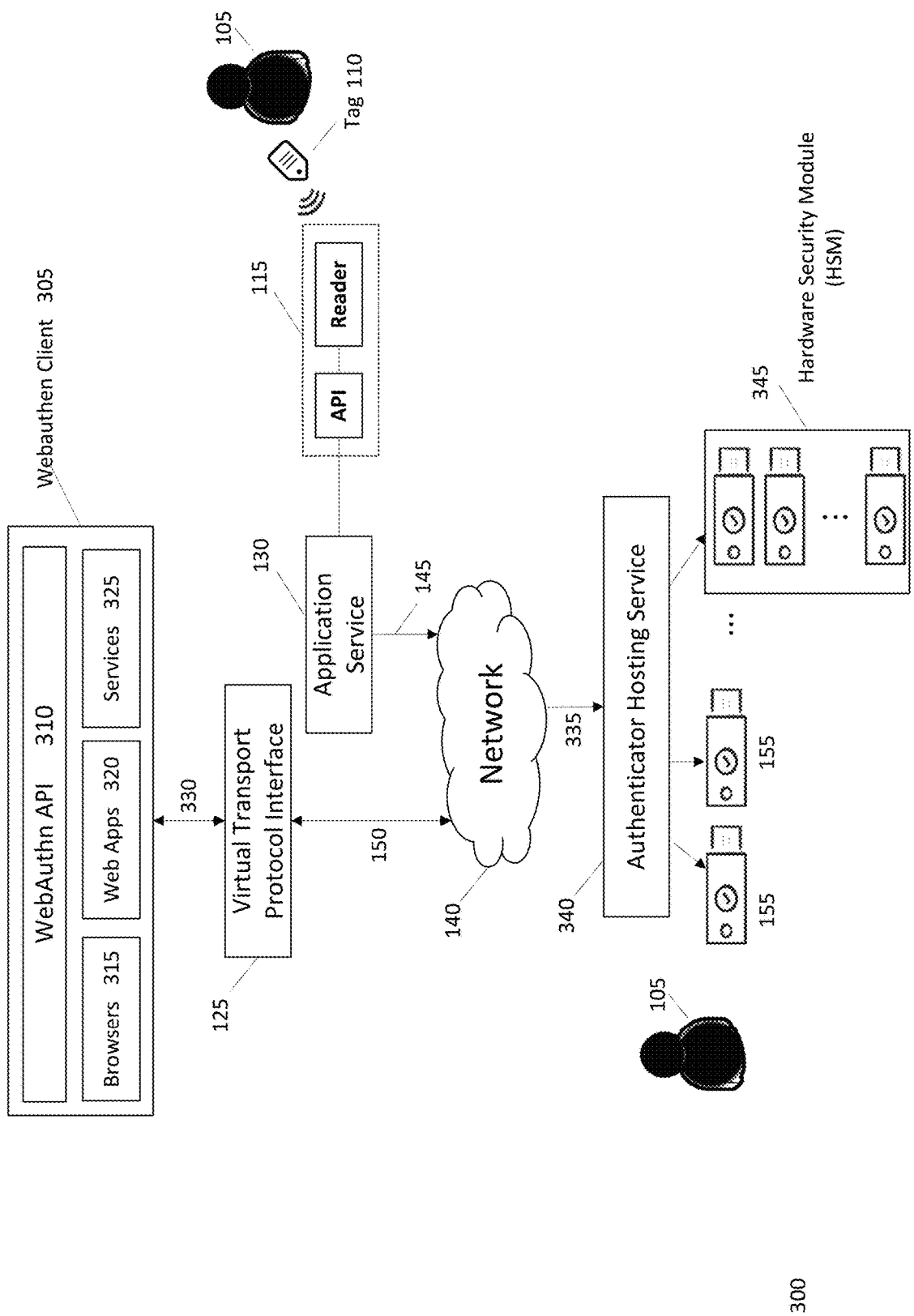
FIG. 3 illustrates a system-architecture diagram for implementing a process of hosting FIDO authenticators on local network or cloud system with components on the user side and other communications on the network side. The diagram illustrates an authenticator hosting service that can host different types of security keys (authenticators) at the same time (such as dedicated hardware keys, virtual authenticators based on HSM on local network or cloud, etc.).

Referring now to FIG. 3, there is shown an example system 300 with another exemplary architecture with components to further illustrate details of hosting FIDO authenticators 155 (security keys) on the network 140. The authentication process starts from WebAuthn client 305 (relying party application) which includes a WebAuthn API 310, and multiple starting points of an authentication request, such as browsers 315, web applications 320 and services 325, for example.

The WebAuthn client 305 (relying party application) registers a user for the first time by sending (e.g. data or communication path) 330 a registration request to the hosted authenticator 155, and receiving a response 335 that is signed by the same authenticator 155 to create a credential key pair. Subsequently, when the WebAuthn client 305 (relying party application) logs in the registered user 105, the relying party application 305 sends (via communication path 330) a login request and receives a login response 335 that is signed by the same hosted authenticator 155. This process is in addition to dedicated hardware/software authenticators 155 (either local or remotely hosted), and can work with authenticators hosted on remote Hardware Security Module (HSM) 345 which is a physical computing device that manages digital keys and performs cryptography functions and can be used to host multiple FIDO authenticators 155 (security keys) for users 105.

Generally, the WebAuthn client 305 (relying party application) can involve client-side script code that invokes the WebAuthn API 310 in the client, and a server-side component that executes the relying party operations, can be accessed by a user 105 of computing device 120 through the web browser 315/application 320/service 325 to reach a remote authenticator 155 either on dedicated hardware/software modules or on HSM 345 for the authentication ceremony. When hosting different types of authenticators 155 on the network 140, in the authentication ceremony a user 105/tag 110 and the user's associated authenticator 155 work in concert to cryptographically prove to a relying party application (WebAuthn client 305) and to the reply party web server that the user controls the credential private key of a public key credential previously-registered as the result of the registration request. Note that this includes a test of user 105 presence and verification that is taking place or managed by application service 130 with receiving 135 user's unique identifiers 110 (RFID tags or access cards) from a connected device such as RFID/NFC reader 115 by detecting tap of a tag or access card which will be used to uniquely identify user's 105 associated authenticator 155 by authenticator hosting service 340.

The credentials belong to the user 105 and are managed by an authenticator 155 remotely hosted either on dedicated hardware/software security module or on HSM 345 on the network 140, with which the relying party browsers 315/web application 320/or services 325 interacts through the WebAuthn API 310. The virtual transport protocol interface 125 receives the authentication request 330, sent by a WebAuthn client 305 using WebAuthn API 310. The virtual transport protocol interface 125 then can work in conjunction with the application service 130 to receive 135 user's unique identifier 110 (RFID tag or access card) and authenticator hosting service 340 to map and locate the user's associated authenticator 155 (security key) either on dedicated hardware/software security modules or on HSM 345 on the network 140.

The process of locating and uniquely identifying the user's associated authenticator 155 can be interpreted as mapping the user's RFID tag or access card 110 to/with the hosted authenticator 155 (either dedicated or HSM based 345) over the underlying network 140 such as local area network or internet. In an example embodiment, the application service 130 may be configured to wait for user 105 to tap RFID tag or access card 110 on a device such as RFID/NFC reader 115 or enter a code or even scan a QR (Quick Response) code. The application service 130 then passes (over communication path 145) received data which is user's tag or access card ID 110 that will be used as unique identifier, to the authenticator hosting service 340 over the network (an application on the network) 140 to bind the associated authenticator 155 (security key) to the user with the unique identifier to process the authentication request 330 which has been passed 150 by virtual transport protocol interface 125 to the network (an application on the network) 140 and finally from there to the authenticator hosting service 340.

The authentication request 330 from WebAuthn client 305 received by virtual transport protocol interface 125 will be delivered to path 150 and through 335 the network (an application on the network) 140 to the authenticator hosting service 340. Authenticator hosting service 340 responds 335 to authentication requests for different situations. One example is through the dedicated hardware or software authenticators 155 and another example is through authenticators stored on HSM 345. If the user has a dedicated hardware or software authenticator 155 (security key), the authenticator hosting service 340 will continue the authentication process using the FIDO CTAP protocol communicating directly with the associated security key 155/345.

As described, hosting service 340 and HSM 345 can be used to store authenticators 155 related to a large number of users 105 in a way that are separately managed to be accessible to only one user through a unique identifier that user possesses. In both cases, there must be a way to identify the authenticator 155 associated with each user 105 during the authentication process. In fact, in order to do FIDO authentication process properly when hosting FIDO authenticators on the network 140, the authenticator hosting service 340 needs a unique identifier (RFID tags or access card 110) to uniquely identify and select the user's associated authenticator 155 (security key). The identifiers provided by users 105 with RFID tag or access card 110 are received through the reader and relevant API 115 and then will be transferred 135 to the network (an application on the network) 140 using the application service 130 and finally will be delivered 335 to the authenticator hosting service 340. The authenticator hosting service 340 maps and binds users 105 with unique identifier such as RFID tag or access card 110 to the associated hosted authenticator (user's security key) 155. The unique identifier acts as an indicator, only to help us find which credential key pairs belong to this user.

The authenticator hosting service 345 processes the authentication request 330 (which can be a login, a registration request, or any other operations supported by the standard authentication protocol) using the associated dedicated authenticator 155 or HSM based authenticator 345, provides a response and replies it back (as data over path 335) to the virtual transport protocol interface 125 as the authentication response. The virtual transport protocol interface 125 writes the authentication response with or without any further changes back to WebAuthn API 310 which can collect the response for WebAuthn client 305 (relying party application).

Referring now to FIGS. 4A-D, which illustrate the flow of different example authentication processes in the described system(s) 100, 200, 300.

Figure 4A:
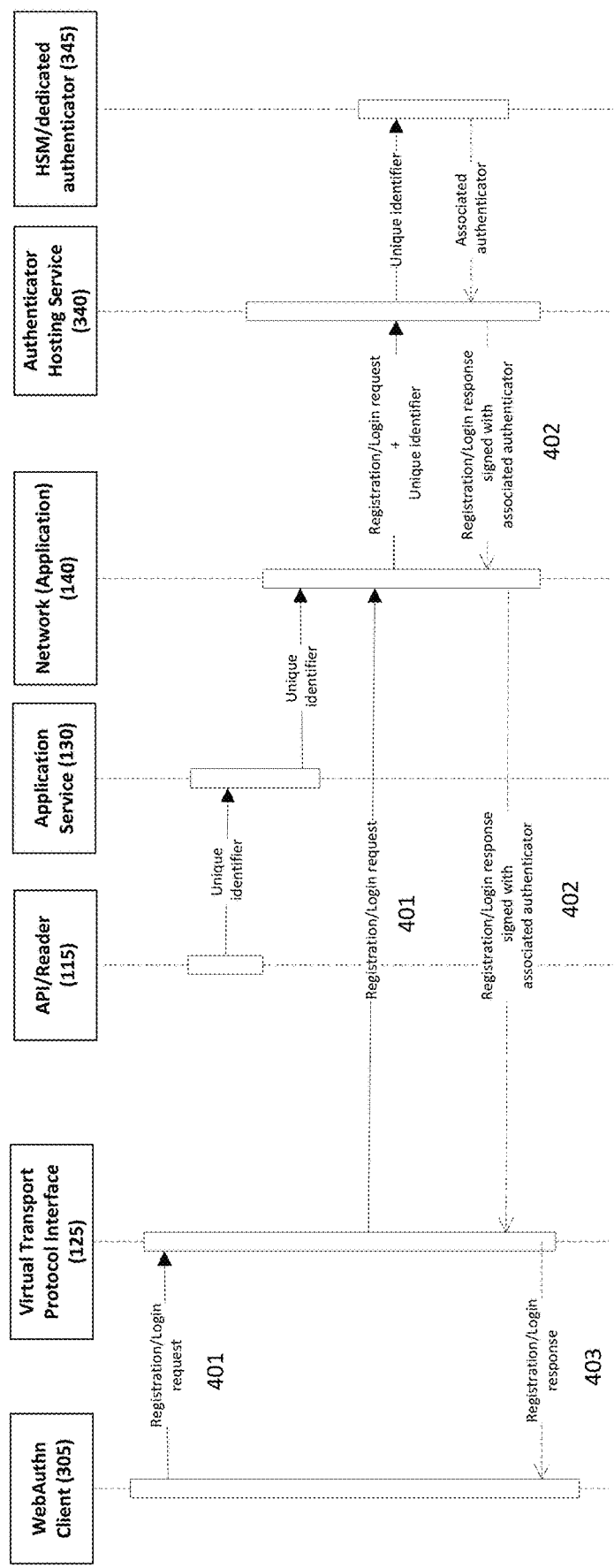
FIGS. 4A-D show example flow diagrams of authentication processes in different ways based on the flow of related data and also the integration of components.

The example method 400 in FIG. 4A shows the authentication process when the network 140 (application on the network), waits for or pulls the unique identifier. The authentication process starts from WebAuthn client 305 by sending (via data or communication path 330) a registration/login request 401 to the virtual transport protocol interface 125 which passes the received request to the application on the network 140. Then, the application service 130 that is configured to wait for user to tap RFID tag or access card 110 on a device such as RFID/NFC reader 115, passes (over path 145) the received data to the application on the network 140. The application on the network 140, delivers both registration/login request 401 and unique identifier to the authenticator hosting service 340. The authenticator hosting service 340, maps and locates the user's associated authenticator 155 (security key) either on dedicated hardware/software security modules or on HSM 345 using the unique identifier. The registration/login response 403 that is signed 402 by the associated authenticator 155 will be delivered back to WebAuthn client 305 through application on the network 140 and virtual transport protocol interface 125.

Accordingly, this example method 400 relates to an application on the network that waits or pulls the unique identifier. WebAuthn client 305 sends (via communication path 330) a request 401 to the virtual transport protocol interface 125 which sends the received request to the application on the network 140. The application service 130 waits for a detected RFID tag or access card 110 on a connected device such as RFID/NFC reader 115. The application service 130 sends (via communication path 145) the received data (e.g. unique identifier) to the application on the network 140. The application on the network 140, delivers the request 401 and the unique identifier to the authenticator hosting service 340. The authenticator hosting service 340 uses the unique identifier to map and locate the user's associated authenticator 155 (security key) either on dedicated hardware/software security modules or on HSM 345. The associated authenticator 155 signs 402 the response 403 and transmits back to WebAuthn client 305 through application on the network 140 and virtual transport protocol interface 125.

Figure 4B:
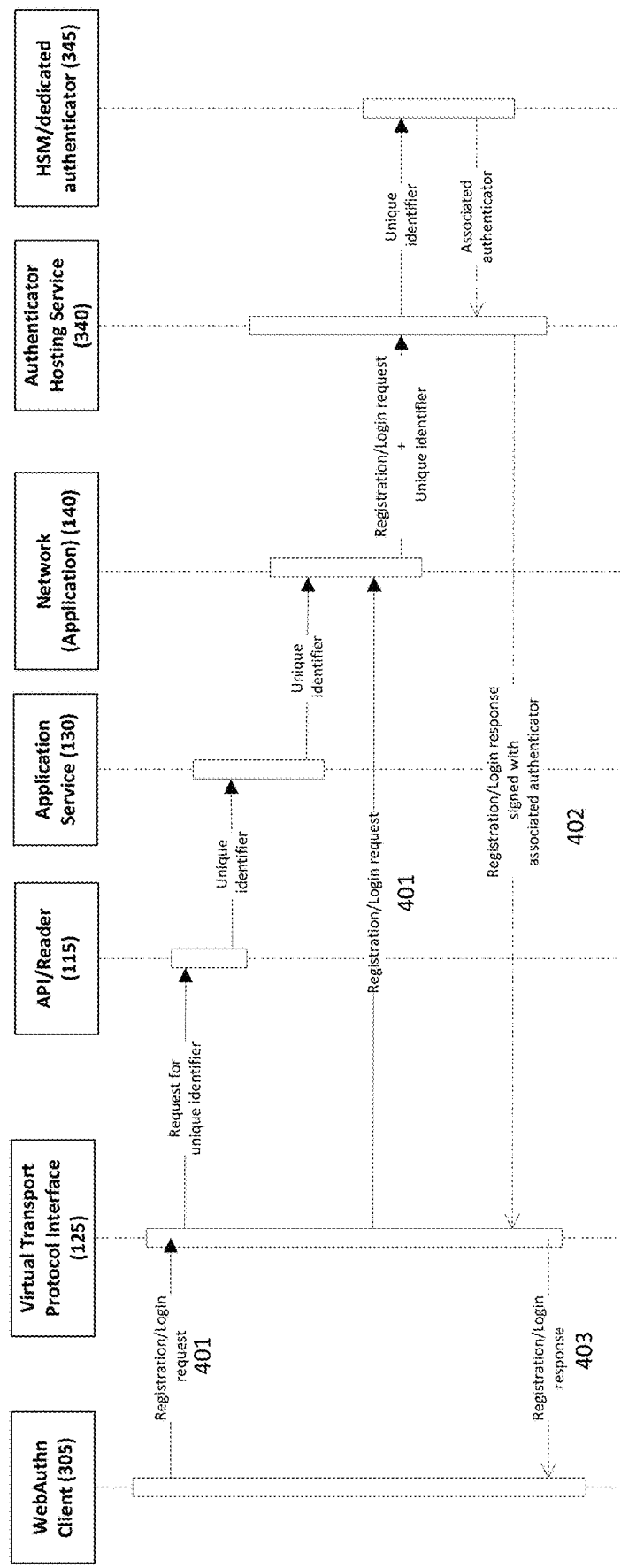

The example method 400 in FIG. 4B illustrates authentication process when the virtual transport protocol interface 125 triggers the reader 115 to get the unique identifier. The authentication process starts from WebAuthn client 305 by sending 330 a registration/login request 401 to the virtual transport protocol interface 125 which passes the received request to the application on the network 140. The virtual transport interface protocol 125, triggers a device such as RFID/NFC reader 115 to receive a unique identifier from user 105 by a tap of RFID tag or access card 110. The application service 130 receives the unique identifier and passes 145 the received data to the application on the network 140. The rest of this method 400 is similar to the method 4000 of FIG. 4A (the application on the network 140, delivers both registration/login request and unique identifier to the authenticator hosting service 340. The authenticator hosting service 340, maps and locates the user's associated authenticator 155 (security key) either on dedicated hardware/software security modules or on HSM 345 using the unique identifier. The registration/login response 403 that is signed 402 by the associated authenticator 155 will be delivered back to WebAuthn client 305 through application on the network 140 and virtual transport protocol interface 125).

Accordingly, this example relates to the virtual transport protocol interface 125 triggering the reader to obtain the unique identifier. WebAuthn client 305 sends (via data or communication path 330) an authentication request 401 to the virtual transport protocol interface 125. The virtual transport protocol interface 125 sends the received request to the application on the network 140. The virtual transport interface protocol 125, triggers a device such as RFID/NFC reader 115 to read a unique identifier by a tap of RFID tag or access card 110. The application service 130 receives the unique identifier and passes (via communication path 145) the received data to the application on the network 140. The rest of this process is similar to the method of FIG. 4A. The application on the network 140 sends the request and unique identifier to the authenticator hosting service 340. The authenticator hosting service 340 maps and locates the user's associated authenticator 155 (security key) either on dedicated hardware/software security modules or on HSM 345 using the unique identifier. The response 403 is signed 402 by the associated authenticator 155 and delivered back to WebAuthn client 305 through application on the network 140 and virtual transport protocol interface 125.

Figure 4C:
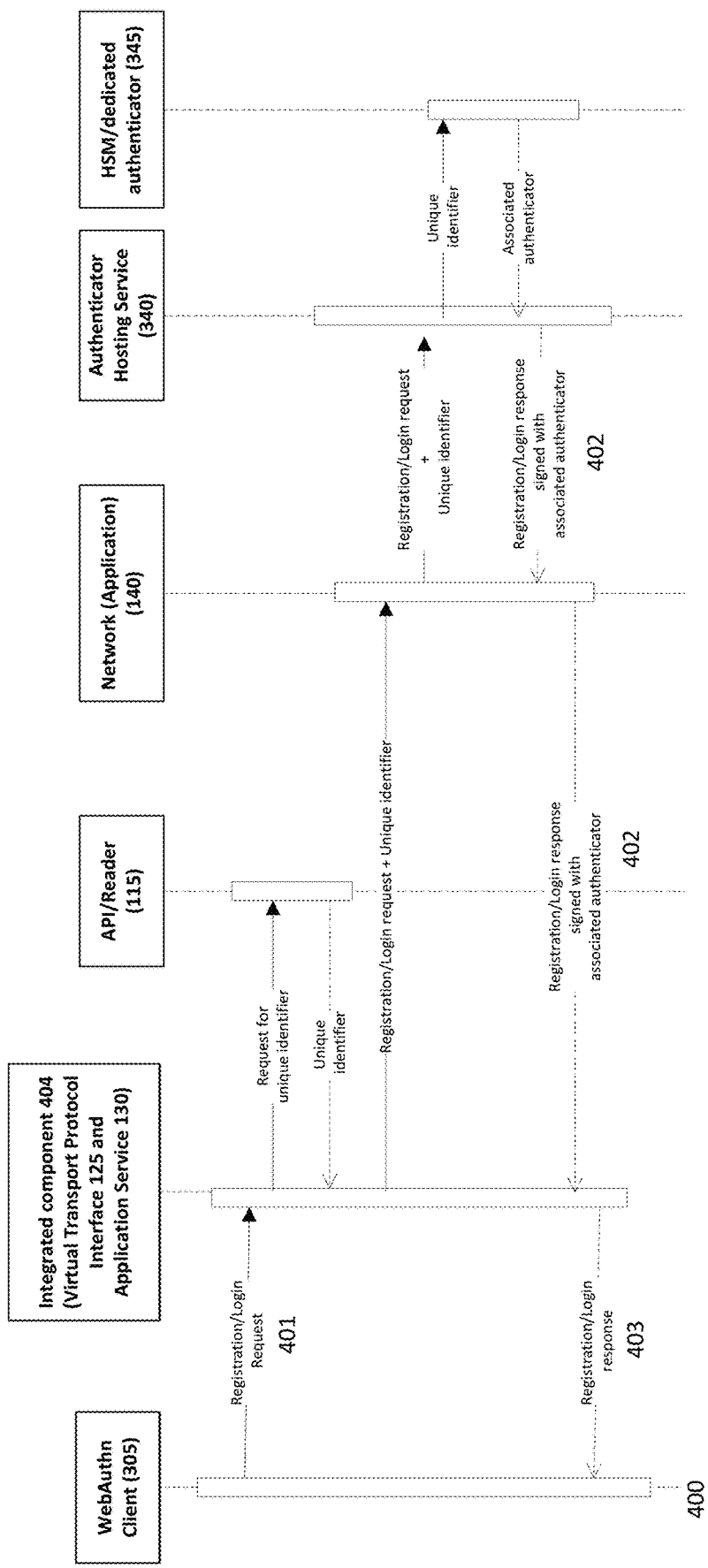

FIG. 4C illustrates authentication process 400 when the virtual transport protocol interface 125 and application service 130 are combined in one integrated entity 404. In this scenario, the virtual transfer protocol interface 125 and application service 130, are combined in a complete integrated component 404. The authentication process in this scenario also starts from WebAuthn client 305 by sending a registration/login request 401 to the integrated component 404 (the virtual transport protocol interface 125 and application service 130). The integrated component 404, triggers a device such as RFID/NFC reader 115 to receive a unique identifier from user 105 by a tap of RFID tag or access card 110. The integrated component 404 passes the received data (unique identifier) to the application on the network 140. The rest of this scenario is similar to scenario A (the application on the network 140, delivers both registration/login request 401 and unique identifier to the authenticator hosting service 340. The authenticator hosting service 340, maps and locates the user's associated authenticator 155 (security key) either on dedicated hardware/software security modules or on HSM 345 using the unique identifier. The registration/login response 403 that is signed 402 by the associated authenticator 155 will be delivered back to WebAuthn client 305 through application on the network 140 and integrated component 404 (virtual transport protocol interface 125 and application service 130)).

Accordingly, the virtual transport protocol interface 125 and application service 130 can be combined in an integrated component 404. The WebAuthn client 305 sends a request 401 to the integrated component 404 (the virtual transport protocol interface 125 and application service 130). The integrated component 404 triggers a connected device such as RFID/NFC reader 115 to receive a unique identifier by a tap of RFID tag or access card 110. The integrated component 404 sends the received data (unique identifier) to the application on the network 140. The application on the network 140 sends both the request 401 and unique identifier to the authenticator hosting service 340. The authenticator hosting service 340 uses the unique identifier to map and locate the user's associated authenticator 155 (security key) either on dedicated hardware/software security modules or on HSM 345. The response 403 is signed 402 by the associated authenticator 155 and delivered back to WebAuthn client 305 through application on the network 140 and integrated component 404 (virtual transport protocol interface 125 and application service 130).

Figure 4D:
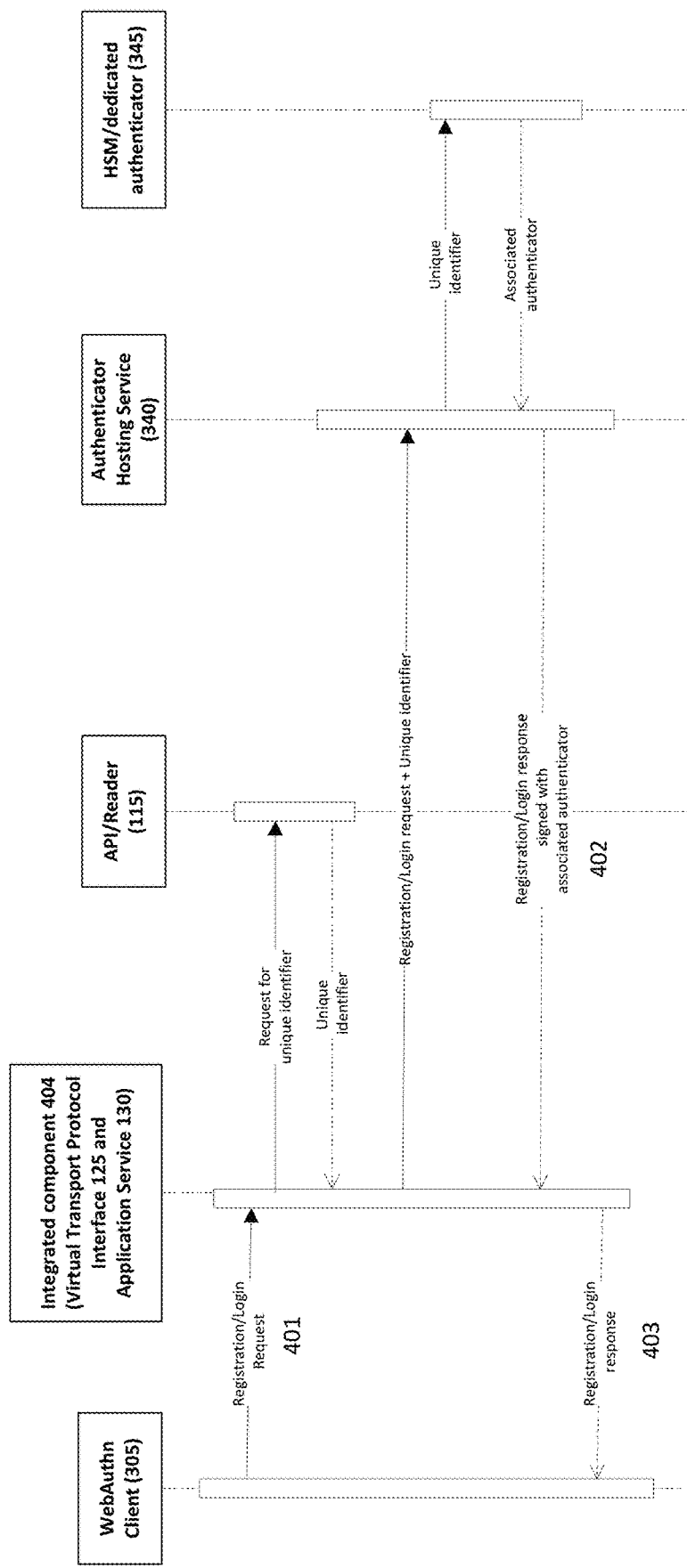

FIG. 4D illustrates authentication process 400 when there is no application on the network 140 or the authentication hosting service 340 and the application on the network 140 are combined together in one component. Although, all three previous example processes 400 (explained in FIGS. 4A, 4B and 4C) can be used here, this processes 400 is described in combination with the process 500 of FIG. 4C (e.g. the integrated component 404). In this scenario, the authentication process also starts from WebAuthn client 305 by sending a registration/login request 401 to the integrated component 404 (the virtual transport protocol interface 125 and application service 130). The integrated component 404, triggers a device such as RFID/NFC reader 115 to receive a unique identifier from user 105 by a tap of RFID tag or access card 110. The integrated component 404 delivers both registration/login request 401 and unique identifier to the authenticator hosting service 340. The authenticator hosting service 340, maps and locates the user's associated authenticator 155 (security key) either on dedicated hardware/software security modules or on HSM 345 using the unique identifier. The registration/login response 403 that is signed 402 by the associated authenticator 155 will be delivered back to WebAuthn client 305 through integrated component 404 (virtual transport protocol interface 125 and application service 130).

Accordingly, in some embodiments, there is no application on the network 140. The WebAuthn client 305 sends a request 401 to the virtual transport protocol interface 125 and application service 130. A device such as RFID/NFC reader 115 receives a unique identifier by a tap of RFID tag or access card 110. The request 401 and unique identifier is sent to the authenticator hosting service 340. The authenticator hosting service 340 uses the unique identifier to map and locate the associated authenticator 155 (security key) either on dedicated hardware/software security modules or on HSM 345. The registration/login response 403 that is signed 402 by the associated authenticator 155 will be delivered back to WebAuthn client 305 through the virtual transport protocol interface 125 and application service 130.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for hosting FIDO authenticators on a local network or a cloud server using dedicated hardware or software security key modules or Hardware Security Modules), comprising:

a computing device having a Web Authentication (WebAuthn) client software, an application service, and a transport protocol interface, wherein the WebAuthn client software represents a relying party application on the computing device, wherein the WebAuthn client software has a WebAuthn Application Program Interface (API) that communicates with a one or more hosted authenticators through an interface on the computing device to send an authentication request associated with a user, receive an authentication response from the one or more hosted authenticators, and return the authentication response to verify the user to the WebAuthn client software representing the relying party, a machine readable unique identifier to uniquely identify the one or more hosted authenticators, and to provide an authorization gesture implying the user's interaction with the one or more hosted authenticators while processing the authentication request;

wherein the application service reads the unique identifier from a connected device, and transmits the unique identifier to an authenticator hosting service through a network, wherein the connected device has a reader and application programming interface that provides the unique identifier to the application service using a communication link on the computing device, the connected device configured to detect the unique identifier via short-range wireless communication;

wherein the transport protocol interface is a driver installed on the computing device to receive authentication requests from the WebAuthn API, to exchange authentication requests with the authenticator hosting service through the network, and to write the authentication response which is taken back from the authenticator hosting service on the interface of the computing device that is used for authentication;

the authenticator hosting service that virtually hosts the one or more hosted authenticators within computing applications, and routes authentication requests to a target authenticator of the one or more hosted authenticators;

wherein the one or more hosted authenticators are accessed using the unique identifier for authentication purposes, wherein the one or more hosted authenticators register the user with the relying party application by creating a credential key pair, and later asserting possession of a registered key credential using the unique identifier.

2. The system of claim 1 wherein the one or more virtually hosted authenticators verify the user when requested by the relying arty application.

3. The system of claim 1, wherein the device for creating the unique identifier is a radio frequency identification (RFID) access card or tag for authentication purposes.

4. The system of claim 1, wherein the interface is selected from the group of USB, BLE, NFC, Hybrid and HTTP/HTTPs to send the authentication request.

5. The system of claim 1, wherein the authentication requests are initiated at the WebAuthn client software using the WebAuthn API for authentication purposes.

6. The system of claim 1, wherein an authenticator existing in remote dedicated hardware or software or stored on HSM registers the user with the relying party application and later assert possession of the registered public key credential.

7. The system of claim 6, wherein the authenticator verifies the user, when requested by the relying party application.

8. The system of claim 1, wherein the WebAuthn API defines a standard web interface enabling the creation and use of strong, attested, scoped, public key-based credentials by web applications, for strongly authenticating users.

9. The system of claim 1, wherein an authentication request starts a registration process by which a public key credential is created on a hosted authenticator (dedicated or HSM based), and scoped to a relying party with the present user's account, an authentication process by which a relying party is presented with an authentication assertion proving the presence and consent of the user who registered the public key credential, or any other authentication operation defined in WebAuthn standard interface used by relying party application for authentication purposes.

10. A method for hosting FIDO authenticators on a local network or a cloud server using dedicated hardware or software security key modules or Hardware Security Modules), comprising:

reading, by an application service, a machine readable unique identifier from a connected device, wherein the connected device has a reader and application programming interface that provides the unique identifier to the application service using a communication link on the computing device, the connected device configured to detect the unique identifier via short-range wireless communication, wherein the machine readable unique identifier uniquely identifies the one or more hosted authenticators to provide an authorization gesture implying the user's interaction with the one or more hosted authenticators while processing the authentication request;

passing the unique identifier to an authenticator hosting service through a network, the authenticator hosting service virtually hosting one or more hosted authenticators within computing applications, and routing authentication requests to a target authenticator of the one or more hosted authenticators;

receiving, at a transport protocol interface is a driver installed on a computing device, an authentication request from Web Authentication (WebAuthn) client software represents a relying party application on the computing device, to exchange authentication requests with the authenticator hosting service through the network, and to write the authentication response which is taken back from the authenticator hosting service on the interface of the computing device that is used for authentication, a computing device having a, an application service, and a transport protocol interface;

accessing the one or more hosted authenticators using the unique identifier for authentication purposes, wherein the one or more hosted authenticators register the user with a given relying party application by creating a credential key pair, and later asserting possession of the registered public key credential using the unique identifier.

11. The method of claim 10 further comprising verifying, by the one or more virtually hosted authenticators, the user when requested by the relying arty application.

12. The method of claim 10 further comprising creating the unique identifier as a radio frequency identification (RFID) access card or tag for authentication purposes.

13. The method of claim 10 further comprising initiating the authentication requests at the WebAuthn client software using a WebAuthn API for authentication purposes.

14. The method of claim 10 further comprising registering the user with the relying party application using an authenticator existing in remote dedicated hardware or software or stored on HSM to later assert possession of the registered public key credential.

15. The method of claim 14 further comprising verifying the user, when requested by the relying party application.

16. The method of claim 10 further comprising, by the WebAuthn API, defining a standard web interface enabling the creation and use of strong, attested, scoped, public key-based credentials by web applications, for strongly authenticating users.

17. The method of claim 10 further comprising completing a registration process by which a public key credential is created on a hosted authenticator (dedicated or HSM based), and scoped to a relying party with the present user's account, an authentication process by which a relying party is presented with an authentication assertion proving the presence and consent of the user who registered the public key credential, or any other authentication operation defined in WebAuthn standard interface used by relying party application for authentication purposes.

\* \* \* \* \*